Feb. 8, 1944. J. O. JACKSON ET AL 2,341,044
INTERSECTING SPHERICAL PRESSURE TANKS
Filed July 28, 1941 5 Sheets-Sheet 1

INVENTORS
James O. Jackson and
Courtney L. Stone
BY Green & McCallister
Their ATTORNEYS

Feb. 8, 1944.　　　J. O. JACKSON ET AL　　　2,341,044
INTERSECTING SPHERICAL PRESSURE TANKS
Filed July 28, 1941　　　5 Sheets-Sheet 5

INVENTORS
James O. Jackson and
Courtney L. Stone
BY
Green & McCallister
Their ATTORNEYS Patented Feb. 8, 1944

2,341,044

UNITED STATES PATENT OFFICE 2,341,044

INTERSECTING SPHERICAL PRESSURE TANK

James O. Jackson, Crafton, and Courtney L. Stone, Pittsburgh, Pa., assignors to Pittsburgh-Des Moines Company, a corporation of Pennsylvania Application July 28, 1941, Serial No. 404,434

9 Claims. (Cl. 220—3)

This invention relates to containers for the storage of liquids or gases under pressure.

Several forms of containers for this purpose are now available including cylindrical containers with curved or dished ends as well as containers which are spherical, spheriodal, ellipsoidal and toroidal in configuration. Each of these different forms has a particular use or application for which it is most suitable. Of all the various forms of pressure containers the spherical form has been considered to be the only one that is truly stable elastically, that is, it does not tend to change its symmetry with an increase of internal pressure. The sphere is commonly known to have a minimum of surface for any given volume or content and to require a minimum wall thickness and, therefore, a minimum of weight for the storage of any actual volume of gas compressed to any specified pressure. Moreover, a spherical container is commonly regarded as being the only shape of vessel which has these characteristics.

One of the objects of the present invention is to provide a new composite container for fluids under pressure which is made up of a number of portions of spherical containers secured together by means of flat circular diaphragms.

Another object of the invention resides in providing a container for fluids under pressure which shall have substantially all the advantages of a single spherical container plus advantages peculiar to itself not shared by single spherical containers.

An additional object of the invention resides in producing a container having a plurality of spherical segmental portions each of which is bounded on at least one side by a diaphragm-like partition to form a plurality of separated compartments and means for equalizing the pressure in such compartments.

Other and further objects and advantages reside in the various combinations, subcombinations and details hereinafter described and claimed and in such other and further matters as will be understood by those skilled in this art or apparent or pointed out hereinafter.

In the accompanying drawings, in which like numerals designate corresponding parts throughout the various views.

Figure 1:
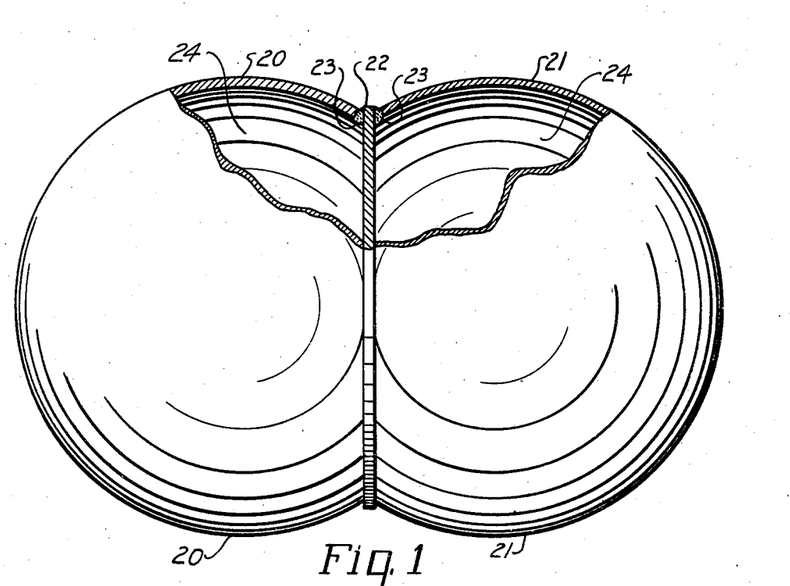
Fig. 1 is a view in elevation of a tank responding to our invention with parts broken away to show the structure thereof; of a tank responding to our present invention.

Referring first to the structural features of our new containers, the simplest form thereof is shown in Fig. 1. In that figure the numerals 20 and 21 designate two partial spheres or spherical shell sections which are joined to a common disc or plate-like member 22 by means of the continuous welds 23. In this form of tank there are two compartments or storage chambers 24 which are separated from one another by means of the diaphragm 22. It is to be understood that the welds 23 are fluid-tight. As will be more fully understood from what follows, the container of Fig. 1 is usually provided with inlet and outlet pipes which make it possible to cause the chambers 24 to communicate with one another, thus insuring equalized pressure throughout the container. Pressure equalization may, however, be secured by providing the diaphragm 22 with a small aperture, thus placing chambers 24 in direct communication with one another. This automatically equalizes the pressure at all times.

Figure 5:
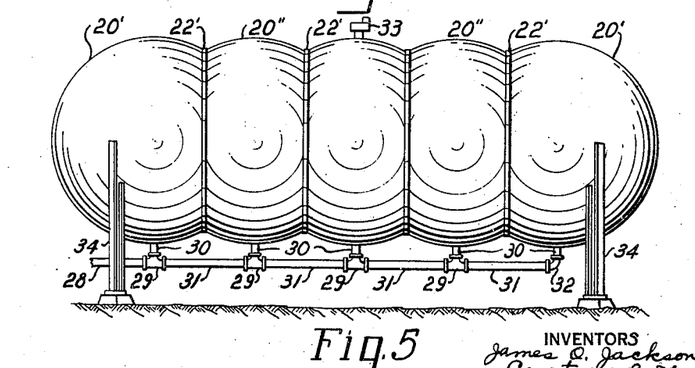
Fig. 5 is an elevational view of a modified form of the invention and showing the supports and piping therefor.

In the modified form of container illustrated in Fig. 5, it will be noted that there are two like end spherical portions 20' and a number of intermediate portions 20" which in this case are in the form of spherical zones. In other words, end members 20' are incomplete spherical shells to the extent that the same have a portion thereof removed so as to intersect the portions 20" in the manner illustrated, the members 20" being, in effect, the central portions of spheres with the diametrically opposite segments removed. A plurality of diaphragms 22' separates the interiors of members 20' and 20" and, while not visible in Fig. 5, it will be understood that the circular welds 23 of Fig. 1 are employed. Thus, the container of Fig. 5 has a plurality of separated compartments or chambers made up of terminal chambers which are spherical segments and intermediate chambers which are spherical zones. In order to equalize the pressure in the various chambers a short pipe 30 is connected into each container portion and pipes 30 by means of T's 29 and elbow 32 are connected into the common pipe 31, the portion 28 of which connects to a suitable source of fluid or to a service or other line or piece of equipment. It is understood that this piping arrangement may be used both for introduction of material into the container and for removal of material therefrom, this being effected by suitable valves and by-passes, as will be appreciated by those familiar with piping arrangements. The fact that all the container portions are thus connected into a common conduit serves to equalize the pressure of the various container portions and to insure that material supplied to the container portions is stored at the same pressure in all of the various spherical portions. A suitable relief valve 33 is provided as shown in order to prevent the pressure in the system from exceeding a predetermined maximum. Supports 34 are shown as provided at each end of the container and, in general, it is to be understood that we may support the container in any suitable manner which per se forms no part of or restriction upon our present invention. The container need not, however, be elevated.

Figure 6:
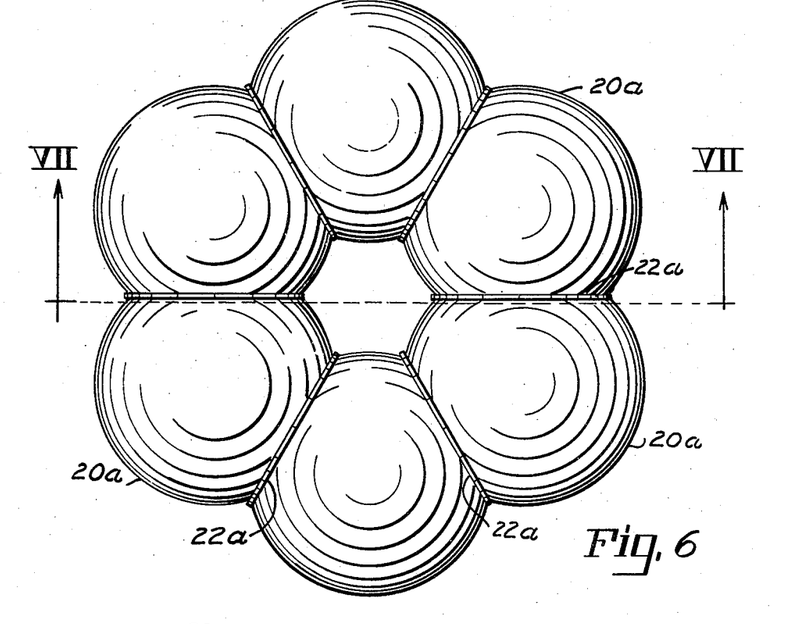
Fig. 6 is a plan view of a composite tank constituting a further modification of our invention and in which the spherical segments are arranged in the general form of a torus.
Figure 7:
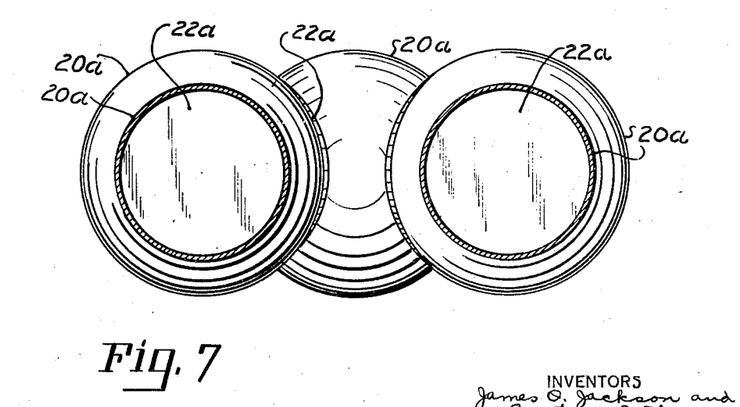
Fig. 7 is in part an elevational view and in part a sectional view taken on line VII—VII of Fig. 6 and in the direction of the arrows thereof.

In Figs. 6 and 7 a further modified form of container has been illustrated and which has the general configuration of a torus. This container is made up of a plurality of spherical segmental portions arranged in ring form with a hollow center and in which each spherical container portion 20a is bounded by and has secured thereto a pair of diaphragms 22a which converge radially inwardly, thus producing a spherical container portion which has the general configuration of a truncated sector. Each diaphragm 22a is to be understood as being secured in place in the same manner as the diaphragm 22 previously described. The plurality of separated compartments or chambers thus provided in this form of the invention are provided with means for equalizing the pressure in each such either by a piping system of the character of Fig. 5 or by providing one or more apertures in each diaphragm. This particular form of container is especially useful for the storage of liquids under pressure where it is advantageous to have a container with a diameter which is large as compared to its height. In this arrangement also pumping costs are reduced.

Figure 8:
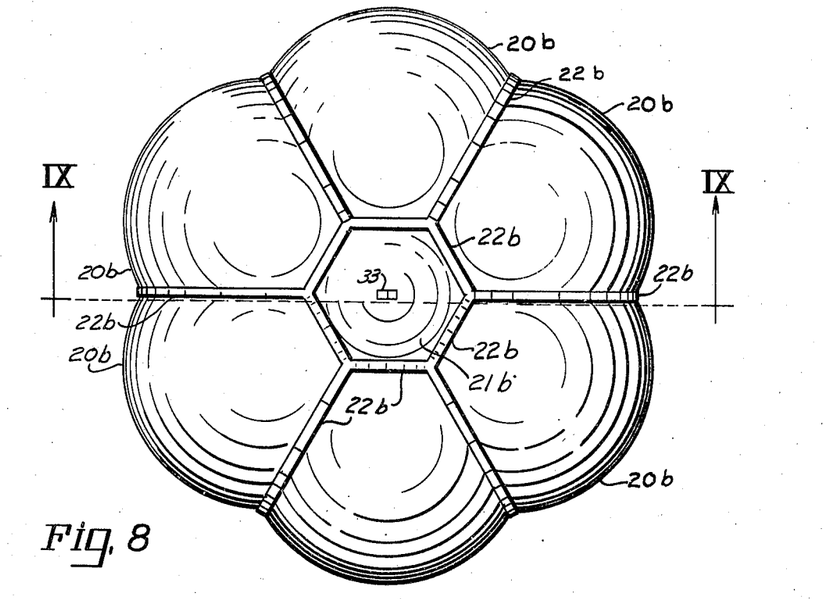
Fig. 8 is a view similar to Fig. 6 but of a further modified form of the invention.
Figure 9:
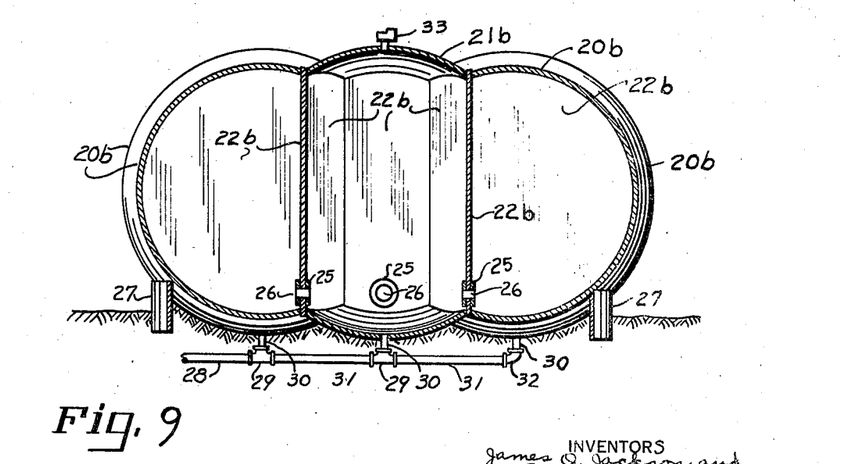
Fig. 9 is a view partly in elevation and partly in section taken along the line IX—IX of Fig. 8 and in the direction of the arrows thereof.

The still further modified form of container of Figs. 8 and 9 is, in general, similar to that of Figs. 6 and 7. There are, however, at least two notable distinctions. In the first place, the diaphragms 22b bounding the spherical container portions 20b are all interconnected and merge into a polygonal central diaphragm 22b' which is, so to speak, inscribed in the center of the torus and in which is the additional spherical container 21b. As will be noted from Fig. 9, the container compartments or chambers thus formed are in communication with each other by means of the openings 26 provided in the diaphragms 22b and 22b', these openings being reinforced by means of the apertured washer-like elements 25 which are secured to the diaphragms. This form of container is also provided with a piping system like that described in connection with Fig. 5. Under these conditions the piping system may be used solely for charging and discharging the container portions and the matter of pressure equalization is taken care of independently by the apertures 26 aforesaid. The virtue of this form of container is that it is capable of storing large volumes of liquids or gases under pressure and has unusual efficiency in that all the space occupied by the container is usefully employed. Supporting means such as the braces or columns 27 may be provided and a relief valve 33 prevents excessive pressure conditions within the container.

Figure 10:
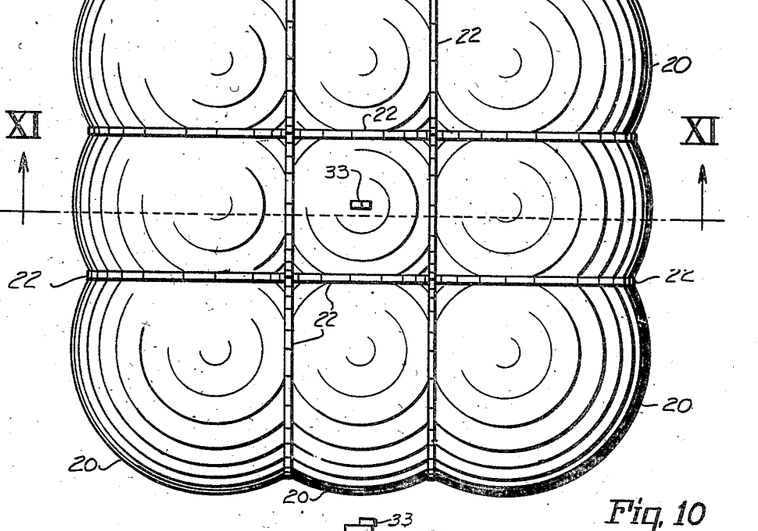
Fig. 10 is a view similar to Fig. 8 but of a still further modified form of the invention.
Figure 11:
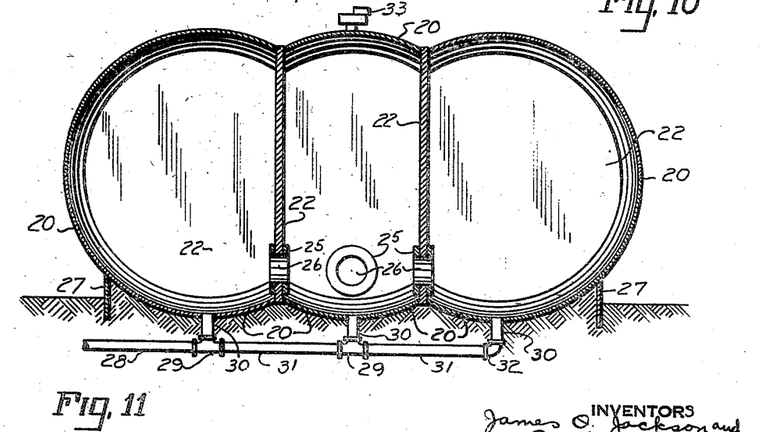
Fig. 11 is a view similar to Fig. 9 but taken along the line XI—XI of Fig. 10 and in the direction of the arrows thereof.

The modified container of Figs. 10 and 11 is substantially the same as that of Figs. 8 and 9 except mainly for the arrangement and disposition of the diaphragms 22c which are arranged to cross each other at right angles and in such manner as to, in effect, form a plurality of containers of the type of Fig. 5. The nature of this form of container will be clearly apparent from what has preceded and the same therefore needs no detailed discussion.

Figures 2, 3, 4:
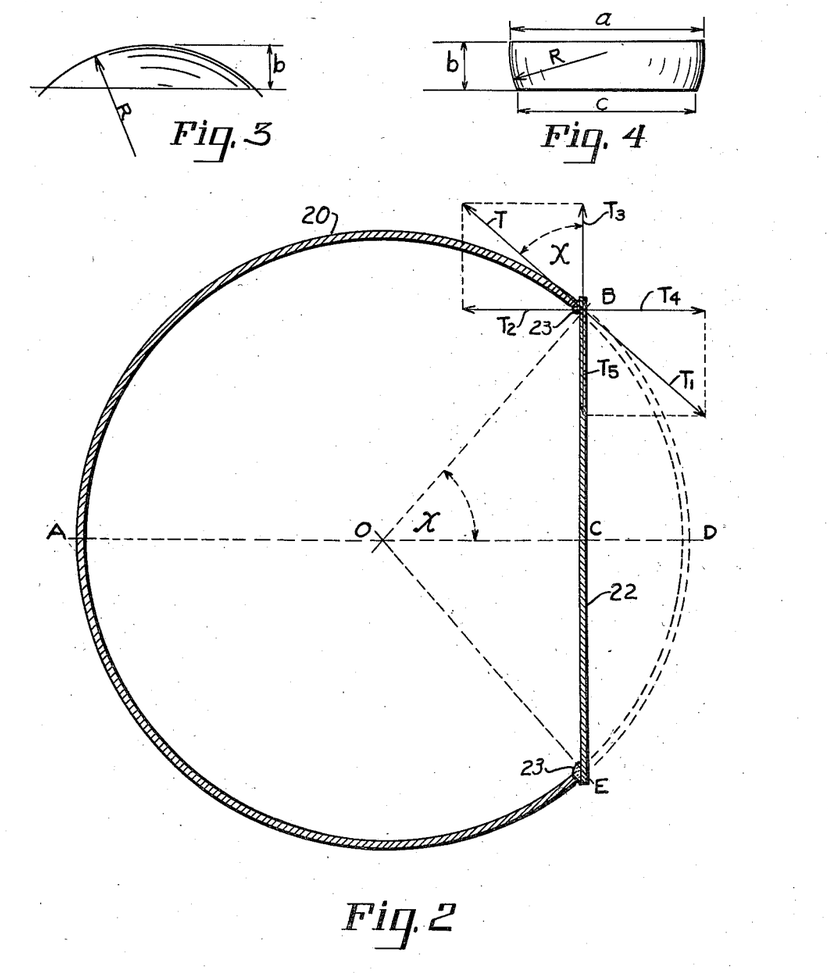
Fig. 2 illustrates a horizontal medial section through one of the partial spheres of Fig. 1 and is provided with geometrical indicia by means of which certain calculations can be made relative to a container of this form.
Figs. 3 and 4 designate in elevation a spherical segment and a spherical zone which are useful in connection with the mathematical aspects of our invention.

In Fig. 2, which is a cross-sectional view of a hollow sphere "ABDEA" cut by a plane passing through the center of the sphere "O," let it be assumed that the sphere contains a gas pressure of "P" pounds per square inch greater than the atmospheric pressure exerted on the outside surface of the sphere. In this case if the shell of the sphere is very thin as compared with its radius the said shell will be stressed substantially in tension due to the internal pressure, such tension being equal in all directions because of the inherent symmetry of the sphere and such tension being numerically equal to PR/2, where P is the internal gas pressure and R is the radius of the sphere. If P is expressed in pounds per square inch and R in inches the tensional stress T will be expressed in pounds per lineal inch of circumference at the center of the shell thickness at any point on the sphere.

Let it be further assumed that the spherical shell 20 is cut by a plane (BCE) and that the larger portion of the sphere ABCEA is closed by means of a flat circular diaphragm 22 attached to the said portion of the sphere as, for example, by welding around the circle of intersection as shown at 23. Plane BCE will intersect the spherical shell in the form of a circle. Now referring to the complete spherical shell it is known that such spherical shell has at all points around the circle caused by the intersection of the said plane a tensile stress equal as previously shown to PR/2. This stress has been indicated on Fig. 2 as T acting upward and to the left and is exactly balanced and counteracted by a like but opposite force $T_1$ acting downward and to the right of the intersecting plane. These forces T and $T_1$ are patently equal and opposite because the tensional forces in all parts of a spherical shell are equal and because the spherical shell is in stress equilibrium.

Now the force T may be resolved into two component forces, $T_2$ acting in a horizontal direction to the left and $T_3$ acting in a radially outward direction with respect to the central point C. Likewise, the force $T_1$ may be resolved into two components, $T_4$ acting horizontally to the right and $T_5$ acting radially inwardly toward central point C. Now when the portion of the spherical surface BDE is removed it is apparent that structure having the ability to resist forces $T_2$ and $T_3$ must be substituted in order to maintain equilibrium conditions. If X is assumed to be the angle subtended by the radius BC of the said intersecting plane to the center of the sphere O it is apparent that the angle between the force T and its component $T_3$ will also be X. The magnitude of force $T_3$ is, therefore $T \cos X$. The diaphragm 12 is, accordingly, stressed by a force having the magnitude of $T \cos X$ acting radially away from the center of the circular diaphragm and its thickness must necessarily be sufficient to resist such force. If the thickness of diaphragm 12 is assumed to be sufficient to resist such force, it is apparent that the structure ABCEA will be out of equilibrium by the sum of the horizontal forces $T_2$ around the circumference of the diaphragm. Now if the said structure ABCEA including the portion of the sphere and the circular diaphragm is placed in contact with another exactly similar structure placing the two diaphragms together and fastening them as by welding around their periphery, making the connection adequate to withstand forces $T_2$ and assuming that the two spherical portions each have an identical pressure of P pounds per square inch on the insides of the shell, then it is apparent that the two spherical portions including the diaphragms will be in complete equilibrium because the horizontal forces $T_2$ will be exactly offset by similar horizontal forces equal to $T_4$ from the adjoining spherical segment and each diaphragm will adequately resist the radial forces $T \cos X$.

One important feature of our invention is based on the fact that if two or more spheres of the same or of different sizes are attached together in the manner we have described the weight of the material required in the shell plus the weight of the material required for the diaphragm for each of the spherical portions divided by the volume or contents of each of the spherical portions will be approximately the same as the weight of the material required to form the shell of any of the entire spherical shells divided by their volume. This can be demonstrated by showing that in Fig. 2 the ratio of the weight per unit of volume of the segment including its circular diaphragm to the volume of that segment is identical with the ratio of the weight of the material of the entire sphere to its volume.

Using the following nomenclature in the English system of units:

$V_s$ is the volume of a sphere or spherical container.
R is the radius of that sphere or spherical element in inches.
P is the pressure in pounds per square inch.
S is the allowable unit working stress in pounds per square inch.
$t_s$ is the spherical shell thickness in inches.
$t_d$ is the diaphragm thickness in inches.
$A_s$ is the area of the spherical surface.
$A_d$ is the area of the diaphragm.
w is the weight of the membrane material in pounds per cubic inch.
$W_s$ is the weight of the spherical shell or spherical element.
$W_d$ is the weight of diaphragm.
$W_T$ is the total combined weight of the shell and diaphragm.
N is any number of spheres or spherical elements.
X is the angle formed between the axis of the sphere perpendicular to an intersecting plane or diaphragm and a radial line from the center of the sphere to the point of intersection of shell with that plane or diaphragm, and hereinafter will be designated as the angle of intersection.

T is the stress per lineal inch in the spherical membrane.
$T_3$ is the stress in diaphragm in a radial direction.
$A_R$ is the area of a circular ring as contrasted with a diaphragm.
$W_R$ is the weight of such circular ring.

The following fundamental equations for the solution of the geometry of spheres and spherical elements will be used.

Spherical segment
  Area $= A_s = 2\pi R b$
  Volume $= V_s = \frac{1}{3}\pi b^2 (3R - b)$
Spherical zone
  Area $= A_s = 2\pi R b$
  Volume $= V_s = (\tfrac{1}{24}) \pi b (3a^2 + 3c^2 + 4b^2)$
Complete sphere
  Area $= A_s = 4\pi R^2$
  Volume $= V_s = \frac{4}{3}\pi R^3$ It has been stated that the weight-volume ratio for any number of spheres is the same as though they were combined in one single sphere and also that the same remains true for spherical elements. We will first prove and derive the constant for a complete sphere and then prove that any portion of a sphere may be removed and the structure closed by the use of a disk member forming part of our invention without changing the weight-volume ratio.

Let it be assumed that the problem is to store a certain volume V of gas under a given pressure of P pounds per square inch, and further let it be assumed that the gas is to be contained in one sphere or N spheres, whichever combination gives the least weight for the desired volume.

Now from the fundamental equations we have

1. $$\frac{V}{N} = \frac{4}{3}\pi R^3$$

volume for each sphere of N spheres

2. $$A_s = 4\pi R^2$$

area for each sphere of N spheres

3. $$W_s = A_s \cdot t_s \cdot w$$

weight of one sphere
Now the stress per lineal inch is

4. $$T = \frac{PR}{2}$$

and the thickness required to withstand this stress is equal to the stress per lineal inch divided by the allowable working stress in pounds per square inch or 5. $$t_s = \frac{T}{S} = \frac{PR}{2S}$$

Substituting Equation 5 in Equation 3 we have as an expression for the weight $W_s$ equal to the following:

6. $$W_s = A_s \left(\frac{PR}{2S}\right) w$$

and substituting Equation 2 for $A_s$ in Equation 6 we have

7. $$W_s = (4\pi R^2)\left(\frac{PR}{2S}\right) w$$

or $$W_s = \frac{2\pi P R^3 w}{S}$$

weight of one sphere; and for the total weight of N spheres

8. $$W_T = \left(\frac{2\pi P R^3 w}{S}\right) N$$

Now from Equation 1

9. $$R^3 = \frac{3V}{4\pi N}$$

and substituting this value of $R^3$ for $R^3$ in Equation 8 we have for the weight of N spheres 10. $$W_T = \left(\frac{2\pi P w N}{S}\right)\left(\frac{3V}{4\pi N}\right)$$

which reduces to

11. $$W_T = \frac{1.5\, P w V}{S}$$

and expressing Equation 11 in terms of weight per unit volume of gas stored we have 12. $$\frac{W}{V} = \frac{1.5\, Pw}{S}$$

This equation shows the weight/volume ratio of a sphere is independent of the number of spheres, that is, one sphere would not weigh more or less than N spheres whose total volume is equal to the one sphere.

Now it will be proved that a portion of a sphere may be isolated and that the same ratio holds true. In Fig. 2, as previously described, volume EABCE is an isolated portion of the sphere EABDE with a plate-like member or disk 22 completing the inclosure. Now this disk is located at any point C on the AD axis in such a manner that radial lines from the center of the sphere O to the outer periphery of the disk makes a constant angle X with the AD axis.

Now the volume of EABCE is equal to the volume of the complete sphere minus the volume of EDBCE and using the fundamental equations for the geometry of the sphere we have $$V_s = \tfrac{4}{3}\pi R^3 - \tfrac{1}{3}\pi b^2 (3R - b)$$

where
$$R = OB = OD = OE = OA$$
$$b = CD$$

but
$$CD = OD - OC = OB - OB \cos X = R - R \cos X$$

so then $$V_s = \tfrac{4}{3}\pi R^3 - \tfrac{1}{3}\pi (R - R\cos X)^2 (3R - (R - R\cos X))$$

$$= \tfrac{4}{3}\pi R^3 - \tfrac{\pi R^2}{3}(1 - \cos X)^2 (3R - R + R\cos X)$$

$$= \tfrac{4}{3}\pi R^3 - \tfrac{\pi R^3}{3}(1 - 2\cos X + \cos^2 X)(2 + \cos X)$$

$$= \tfrac{4}{3}\pi R^3 - \tfrac{\pi R^3}{3}(2 - 3\cos X + \cos^3 X)$$

$$= \tfrac{2\pi R^3}{3} + \tfrac{1}{3}\pi R^3 (3\cos X - \cos^3 X)$$

$$V_s = \tfrac{\pi R^3}{3}(2 + 3\cos X - \cos^3 X)$$

The spherical surface area of the above volume is equal to the area of the whole sphere minus the area of the isolated smaller portion or $$A_s = 4\pi R^2 - 2\pi R b$$

where R and b have the same values as above or $$A_s = 4\pi R^2 - 2\pi R (R - R \cos X)$$
$$= 4\pi R^2 - 2\pi R^2 (1 - \cos X)$$
$$= \pi R^2 (4 - 2 + 2\cos X)$$

or
$$A_s = 2\pi R^2 (1 + \cos X)$$

The weight of the spherical shell is equal to the area multiplied by the thickness by the weight per cubic unit all in like units or $$W_s = 2\pi R^2 (1 + \cos X)\, t_s w$$

The area of the disk is equal to a circular area of which BC is the radius or $$A_d = \pi \overline{BC}^2$$

but
$$BC = OB \sin X = R \sin X$$

so that
$$A_d = \pi R^2 \sin^2 X$$

but
$$\sin^2 X = (1 - \cos^2 X)$$

or
$$A_d = \pi R^2 (1 - \cos^2 X)$$

Now the thickness of the spherical shell is equal to the stress per inch divided by the allowable unit stress or $$t_s = \frac{T}{S} = \frac{PR}{2S}$$

and the thickness required for the disk is equal to the stress per inch of circumference multiplied by the length over which it acts divided by the allowable unit stress multiplied by the length over which the unit stress is effective all in like units or as expressed by $$t_d = \left(\frac{T_s}{S}\right)\left(\frac{BC}{BC}\right)$$

or
$$t_d = \frac{PR \cos X}{2S} \cdot \frac{R \sin X}{R \sin X}$$

or
$$t_d = \frac{PR \cos X}{2S}$$

and the weight of the disk is equal to the area of the disk multiplied by the thickness and weight per cubic unit all in like units or expressed by $$W_d = A_d \cdot t_d \cdot w$$

and the total weight of the complete structure then is $$W_T = W_s + W_d$$

Collecting all the equations in a group we have:

1. $$V_s = \tfrac{\pi R^3}{3}(2 + 3\cos X - \cos^3 X)$$
2. $$A_s = 2\pi R^2 (1 + \cos X)$$
3. $$A_d = \pi R^2 (1 - \cos^2 X)$$
4. $$t_s = \frac{PR}{2S}$$
5. $$t_d = \frac{PR}{2S} \cos X$$
6. $$W_s = A_s \cdot t_s \cdot w = 2\pi R^2 (1 + \cos X)\cdot t_s \cdot w$$
7. $$W_d = A_d \cdot t_d \cdot w = \pi R^2 (1 - \cos^2 X)\cdot t_d \cdot w$$
8. $$W_T = W_s + W_d$$

Now substituting $t_s$ in Equation 4 for $t_s$ in Equation 6 we have $$W_s = 2\pi R^2 (1 + \cos X)\left(\frac{PR}{2S}\right) w$$

or
$$W_s = \frac{\pi P R^3}{S}(1 + \cos X) w$$

and substituting $t_d$ in Equation 5 for $t_d$ in Equation 7 we have $$W_d = \pi R^2 (1 - \cos^2 X)\left(\frac{PR \cos X}{2S}\right)(w)$$

$$W_d = \frac{\pi P R^3}{2S}(1 - \cos^2 X)(\cos X)(w)$$

and then from Equation 8 we have $$W_T = \frac{\pi P R^3}{S}(1+\cos X)w + \frac{\pi P R^3}{2S}(1-\cos^2 X)(\cos X)w$$

$$= \frac{\pi P R^3 w}{S}\left[1+\cos X + \frac{1}{2}\cos X - \frac{1}{2}\cos^3 X\right]$$

$$= \frac{\pi P R^3 w}{2S}[2 + 2\cos X + \cos X - \cos^3 X]$$

$$W_T = \frac{\pi P R^3 w}{2S}(2 + 3\cos X - \cos^3 X)$$

Now from Equation 1 it is shown that $$R^3 = \frac{3V}{\pi(2+3\cos X - \cos^3 X)}$$

and substituting this value of $R^3$ for $R^3$ in the above equation we have $$W_T = \frac{\pi Pw}{2S}\left(\frac{3V}{\pi(2+3\cos X - \cos^3 X)}\right)$$

$$\left(\frac{2+3\cos X - \cos^3 X}{1}\right)$$

or $$W_T = \frac{3VPw}{2S} = \frac{1.5\ PVw}{S}$$

and $$\frac{W}{V} = \frac{1.5\ Pw}{S}$$

which is the same constant as that found in the previous proof. This proves then that if a portion of a spherical shell is removed and the opening is closed by a disk that there is no loss in the relative merits of the sphere in regard to weight/volume ratio. This fact then allows several spheres to be joined together economically without losing the properties of a sphere in elastic stability.

Since the above proof is for a sphere of any radius and any internal pressure and with a diaphragm of any size and subtending any given angle to the center of the sphere it is obvious that this ratio will hold for any number of spheres attached to each other regardless of their size or the angle of attachment provided only that the pressure in all of the spheres is the same. In actual practice we place one or more small reinforced intercommunicating holes in each diaphragm so that the pressures will properly equalize or, in some cases, we find it convenient to attach the inlet and outlet piping to all of the spheres which accomplishes the same result.

Referring to Formula 5

$$t_d = \frac{PR}{2S}\cos X$$

since $$\frac{PR}{2S}$$

equals the thickness of the spherical shell and since cos X equals the distance from the center of the disk to the center of curvature of the spherical shell divided by the radius of the spherical shell, then it follows that the thickness of the disk required to reinforce one truncated spherical shell of a container made up of intersecting truncated shells may be stated to be the thickness of that spherical shell times the ratio that the distance of the center of the disk from the center of curvature of the spherical shell bears to the radius of the spherical shell.

For two adjoining truncated spherical shells of the same radius, the required thickness of a single disk to give to the container the elastic stability of a single sphere would therefore vary with the radius of the circle of intersection of the two spherical shells. When the radius of the circle of intersection approaches zero, the thickness approaches two times the thickness of the spherical shell. When the radius of the intersection approaches the radius of the spherical shell the thickness approaches zero. When the radius of the intersection is equal to the square root of .75 or about .86603 times the diameter of the spherical shell, the thickness of the disk would be the same as that of the spherical shell.

If a circular ring were used to reinforce the spherical shell at the circle of intersection instead of our solid diaphragm it may be designed to adequately resist the force $T \cos X$ indicated as $T_3$ in Fig. 2. In this type of construction, which is not new, it can be proved that the ring if designed to resist the forces $T_3$ transmitted to it from each of the spherical segments, will weigh twice as much as the diaphragm which is the basis of our invention. Further the ring would, in the cases of some forms of our invention, interfere with other essential members. Following is a demonstration of the fact that the ring will weigh approximately twice that of a flat circular diaphragm which will withstand the same radial loading.

Assume two spheres 10 and 11 as in Fig. 1 except joined together and reinforced by a circular ring in lieu of a diaphragm. Now from our previous solutions we know that the radial stress per inch of circumference from one sphere is $$T_3 = (PR/2)\cos X$$

but since we have two spheres $T_3$ becomes $$T_3 = 2 \cdot \frac{PR}{2}\cos X = PR \cos X$$

and if the total force to be resisted is L then $$L = (PR \cos X)\ \overline{BC} = (PR \cos X)\ (R \sin X)$$

and if $A_R$ is used to designate the cross-sectional area of the ring we have $$A_R = L/S = \left(\frac{PR \cos X}{S}\right)R \sin X$$

Now if it be assumed that the center of gravity of the ring is on the theoretical intersecting point of the two spheres then the weight of the ring is equal to the volume generated as the cross section moves along the circumference of a circle passing through the center of gravity of the ring, the said circle having a radius equal to the perpendicular distance from an axis joining the centers of the two spheres to their common circle of intersection, multiplied by the weight per cubic volume of the ring, or $$W_R = A_R \cdot 2\pi \overline{CB} \cdot w$$

$$= A_R \cdot 2\pi (R \sin X)w$$

$$= \left(\frac{PR \cos X \cdot R \sin X}{S}\right)(2\pi R \sin X)w$$

$$= \frac{(2\pi PR^3 \cos X)(\sin^2 X)}{S}w$$

or $$W_R = \frac{2\pi PR^3 w}{S}(1 - \cos^2 X)\cos X$$

Referring to the weight of a diaphragm we have since there are two spheres the weight of two diaphragms $$W_D = 2\left(\frac{\pi PR^3 w}{2S}\right)(1-\cos^3 X)(\cos X)$$

or $$W_D = \frac{\pi PR^3}{S} w(1-\cos^2 X)\cos X$$

and comparing the weight of the ring against that of a diaphragm we see that the weight of a ring is twice as much as that required for a diaphragm for the same loading condition.

One of the principal advantages of our invention is that comparatively large structures may be built without requiring much, if any, additional support for the relatively thin sheet metal shell surfaces. The circular diaphragms which are an inherent part of our invention act to very efficiently support the membrane surfaces of our structure. In the case of very large structures it is desirable to reinforce or stiffen the diaphragms so that they will more effectively support the membrane surfaces and in cases where the structures are to be used to contain only relatively small internal pressures, the thickness of the material forming the shell may be insufficient to support the shells even with the assistance of the circular diaphragm. In such cases each individual spherical segment may be very simply supported by a central column and radial girder-like members such as are commonly used in large containers.

From the foregoing, it will be apparent to those skilled in this art that by making assemblies of our truncated spherical shells and diaphragms, containers may be built to suit certain conditions, particularly as to space limitations, such as the diameter and height. Such assemblies will be much more efficient and much less costly than a single container having the same diameter and height. Such single containers will require much more material for their construction than our assemblies. This is especially so in cases where the single container has relatively flat upper and lower surfaces and is to take the place of the container of Fig. 6. In many cases, it would be impractical to either design or build a single container where it would not only be possible to design but to build a container embodying our invention.

It is to be understood that the foregoing is presented as illustrative and not as limitative and that we may resort to other and further additions, omissions, substitutions and modifications without departing from the principle or scope hereof. The invention is rather that defined by the appended claims.

Having thus described our invention, what we claim as new and desire to secure by Letters Patent is:

1. A container comprising truncated intersecting spherical shell sections and a plate-like reinforcing disk member which forms a partition between such shell sections and is welded to the adjacent intersecting edges thereof; such reinforcing member having a thickness equal to the sum of the thicknesses of the adjoining shell sections when such thicknesses are each multiplied by the ratio that the distance from the center of such reinforcing member to the center of curvature of each such shell section bears to the radius of that shell section.

2. A container comprising a series of truncated intersecting spherical shell sections and plate-like reinforcing disk members forming partitions between such shell sections and to which such shell sections are joined at their truncations; each such reinforcing member having a thickness equal to the sum of the thicknesses of the adjoining shells when such thicknesses are each multiplied by the ratio that the distance from the center of such reinforcing member to the center of curvature of each such shell bears to the radius of that shell.

3. A container as defined in claim 2 in which the truncated spherical shell sections are so arranged as to approximate a rectangular structure.

4. A container as defined in claim 2 in which the truncated spherical shell sections are arranged in the form of a torus.

5. A container as defined in claim 2 in which a number of the plate-like reinforcing disk members are arranged in parallel spaced relation.

6. A container as defined in claim 2 in which a number of the plate-like reinforcing disk members lie in planes radiating from the common center of the container.

7. A pressure tank comprising at least two truncated intersecting spherical shell sections having the same radius and thickness and a plate-like disk shell reinforcing member forming a partition between such shell sections and to which such shell sections are welded at their truncations, said reinforcing member having a thickness equal to the thickness of one of such shell sections; such shell sections being attached together and to such reinforcing member at their truncations to form a fluid tight container; each reinforcing member having a radius at the circle of attachment approximating seven eighths of the radius of the spherical shell sections.

8. A pressure container comprising a series of truncated intersecting spherical shell sections having the same radius and thickness, and circular plate-like disk reinforcing members welded to adjoining shell sections at their intersection and forming partitions between such shell sections; each such reinforcing member having a thickness equal to the thickness of one such shell section multiplied by the distance between the centers of curvature of adjacent shell sections divided by the radius of one such shell section.

9. A pressure container comprising a series of truncated intersecting spherical shell sections and circular plate-like disk members located between and joined to adjacent shell sections at their intersection to form reinforcements for and partitions between such shell sections; the plate-like member between each two adjacent shell sections of the series having a thickness equal to the thickness of one such shell section multiplied by the distance from its center of curvature to the center of such plate-like member divided by the radius of curvature of such shell section, plus the thickness of the other shell section multiplied by the distance from its center of curvature to the center of such plate-like member divided by the radius of curvature of such other shell section.

JAMES O. JACKSON.
COURTNEY L. STONE.